Patented Sept. 22, 1925.

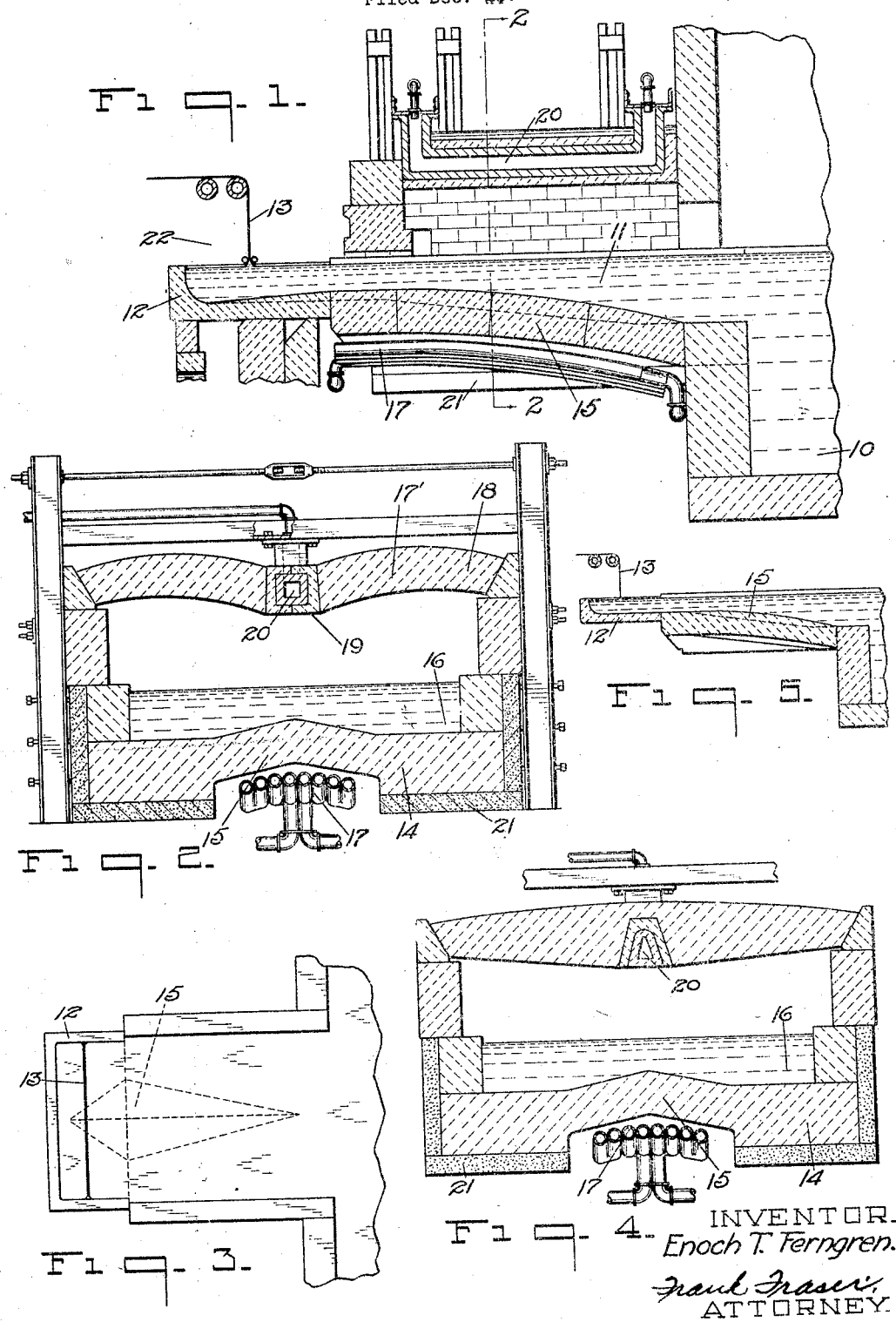

1,554,268

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

COOLER-CHAMBER CONSTRUCTION.

Application filed December 23, 1924. Serial No. 757,605.

*To all whom it may concern:*

Be it known that I, ENOCH T. FERNGREN, a citizen of the United States, residing at Toledo, in the county of Lucas and State of Ohio, have invented new and useful Improvements in Cooler-Chamber Construction, of which the following is a specification.

The present invention relates to sheet glass drawing apparatus, and has particular reference to an improved cooling chamber and draw-pot.

An important object of the invention is to provide a cooling chamber wherein the molten glass passing from the tank furnace to the draw-pot will be so conditioned that it will have a uniform lowered temperature and approximated equal flow velocity throughout its entire width when reaching the point from where the sheet is drawn.

A further object of the invention is to provide a cooling chamber for use in sheet glass apparatus wherein the central relatively hot glass is so acted upon that it will have substantially the same temperature and velocity of flow as the border portions of the flow.

A still further object of the invention is to provide a cooling chamber for sheet glass apparatus wherein the central portion of the flow of glass will be made relatively colder while the border portion flows will be retained relatively hot to equalize the temperature conditions throughout the entire width of the stream of glass passing therethrough.

Other objects and advantages of the invention will become apparent during the course of the following description.

In the drawings wherein for the purposes of illustration is shown the preferred embodiment of the invention.—

Fig. 1 is a fragmentary longitudinal section through a portion of a sheet glass apparatus illustrating my improved form of cooling chamber, Fig. 2 is a section taken on line 2—2 of Fig. 1, Fig. 3 is a top plan thereof, Fig. 4 is a transverse section of a slightly modified construction, and Fig. 5 is a longitudinal vertical section through another form of apparatus.

The type of apparatus herein disclosed employs the apparatus and process set forth in the Colburn Patent No. 1,248,809, granted December 4, 1917, wherein a quantity of glass is formed in a tank furnace after which it is passed through a refining chamber and a cooling chamber to condition the same for withdrawal from a draw-pot in sheet form.

In this type of construction it has been found that unless precautions are taken the central flow of glass through the refining and cooling chambers and in the draw-pot will be relatively swifter than the border portions, while at the same time this central flow of glass will have a relatively higher temperature.

This has caused an unequal quantity flow of glass to different portions of the glass containing space of the draw-pot, and it has been largely responsible for any irregularities in the sheet being drawn. The molten glass from which the sheet is drawn has a tendency to drag along its edges because of its relatively lower temperature and inherent tendency to cling to the side walls of the chambers through which it passes.

It is an object of the present invention to equalize as far as possible the temperature conditions throughout the flow of glass as well as the speed of flow so that the glass when reaching a point where it is drawn into sheet form will be substantially of a uniform nature.

In the drawings wherein like numerals are employed to designate like parts throughout the same, the numeral 10 designates the tank furnace, the numeral 11 the cooling chamber, and 12 the draw-pot. The sheet 13 is drawn from the pot 12 by any suitable apparatus.

The form of cooling chamber herein employed comprises a floor or bottom 14 which is provided with the raised portion or hump 15 centrally thereof and gradually spreading out so that channels 16 are substantially formed at the border portions of said chamber. Fig. 3 shows a top plan of the projection 15.

Due to the raising up of a portion of the bottom of the cooling chamber it will be seen that the central flow of glass is reduced in depth, thus having a tendency to lower the temperature thereof. In addition there is a greater surface for the central glass to adhere to, thus having a tendency to retard the flow of glass over this point. To assist in lowering the temperature of the glass to amplify its clinging capacity, and retarding the central flow of glass, a cooler construction 17 may be positioned beneath the raised portion 15.

The cover-arch now in use is relatively higher in the center than the edges of the chambers, thus presenting more space above the center of the glass flow for heat currents than at the edges. This is another one of the reasons why the central flow of glass has been more rapid than required.

In the present form the cover-arch 17 is so formed that its highest points are at the ends as at 18, while the center 19 is relatively lower. This will create larger pockets along the edges of the cooling chamber so that an increased heat column or volume of heat will be had along these portions, and also the heat which is collected and thrown back to the glass from the arch will now be directed toward the sides of the glass stream. To further assist the reduction of temperature along the center flow of glass, a cooling chamber 20 may be disposed within the cover-arch 17 or partially countersunk therein as shown in Fig. 4.

The insulation block 21 will largely prevent radiation of heat from the side and bottom walls of the cooling chamber 11 adjacent channels 16, and then build up or increase the heat energy present in said walls at their inner faces where the glass contacts.

With this form of construction the glass flowing into the cooling chamber will be retarded in the center and allowed to increase the flow along the border portions, while at the same time the reduced temperature conditions throughout will be made more uniform. This will be of great assistance to the formation of a smooth flat sheet. The projection 15 may be formed as in Fig. 3, wherein it extends a substantial distance within the draw-pot 12, or it may be confined entirely to the cooling chamber as in Fig. 5. The cooling medium passing through the coolers 17 and 20 may either be compressed air or a cold fluid.

The thing which is being done from a point of view of method treatment of the glass is this, that the heat volume of the furnace portion 11, which normally has its center of greatest heat volume of the cooling chamber 11, is now divided into two heat volumes, each having their center of most positive heat value at the vertical side walls of the channels 16, which will give a relatively higher rate of fluency to the glass at these localities, reducing the retarding effect of the side walls of the channels 16, and in fact establishing the center for least resistance to glass movement near these walls, which in turn will cause the hot glass to constantly advance from the furnace into the pot mainly along a stream path through each channel 16, thereby also constantly perpetuating these two separate heat centers by the relatively greater release of heat energy from the glass caused at these points.

The insulation material 21 as placed serves to retain the heat in the deeper substratum of the glass, and thus increases its mobility.

The sheet supplying glass stream treated in this fashion will advance less as a stream and more as a cohesive unit-formation toward the line of draw of the sheet, and will normally have less adhesion to the walls of the pot if the same are properly heated. The relatively deeper forward or closed end of the pot 1: shown in Fig. 1 promotes under-current glass movement thereto as the sheet is being drawn and reduces the resistance to glass movement into the sheet from this portion of the glass body, so that relatively more glass will move, and be free to move in response to drawing action, which insures a more constant and active emptying out and replacement of the glass in this end of the pot; also this deeper portion of the pool of glass will always retain more heat being fed from the now much hotter substratum going through the channels 16, which promotes uniform fluency.

The knurled rollers 22 may now also be driven at a slower speed than heretofore, while the sheet may be drawn at a faster rate, as the condition which predisposes the sheet to pull thin at the center is now eliminated.

Claims:

1. In sheet glass apparatus, including a cooling chamber, means for continuously passing a stream of molten glass therethrough, means for retarding the flow of the central portion of the stream, and means for increasing the column of heat above the border portion of said stream of glass.

2. In sheet glass apparatus, including a cooling chamber, means for continuously passing a stream of molten glass therethrough, means for retarding the flow of the central portion of the stream, and means for absorbing a portion of the heat from the heat column disposed above the center of said stream.

3. In sheet glass apparatus, including a cooling chamber, means for continuously passing a stream of molten glass therethrough, and means for absorbing a portion of the heat from the heat column present above the central flow of said stream.

4. In sheet glass apparatus, including a cooling chamber, means for continuously passing a stream of molten glass therethrough, means for reducing the depth of the central flow of said stream, and means for lowering the temperature thereof.

5. A cooling chamber for use in sheet glass apparatus, comprising a bottom having an upwardly inclined portion, side walls and a cover therefor, said cover being arched downwardly.

6. A cooling chamber for use in sheet glass apparatus, comprising a bottom having an inclined portion, side walls, a cover therefor, the central portion of side cover being relatively closer to the bottom of the cooling chamber than the side portions.

7. A cooling chamber for use in sheet glass apparatus, comprising a bottom having a raised portion extending centrally thereof, side walls and a cover therefor, and a cooler associated therewith.

8. A cooling chamber for use in sheet glass apparatus, comprising a bottom having a raised portion extending centrally thereof, side walls and a cover therefor being arched downwardly, and a cooler associated with the center of said cover.

9. A cooling chamber for use in sheet glass apparatus, comprising a bottom having a raised portion arranged centrally thereof, a cooler associated with the raised portion, side walls, a cover arch, being arched downwardly and having a portion relatively close to the raised portion of the bottom, and a cooler associated with the cover arch.

10. The process of producing sheet glass, consisting in flowing a stream of molten glass to a point where it can be drawn off in sheet form, in a manner that heat is absorbed from the central flow of the stream from the top and the bottom thereof.

11. The process of producing sheet glass, consisting in flowing a stream of molten glass to a point where it may be drawn off in sheet form, in a manner that the central flow of the stream is retarded in its movement, and then absorbing heat from the central flow both from the top and the bottom.

12. The process of producing sheet glass, consisting in flowing a stream of molten glass from which a sheet of glass is to be drawn through a cooling chamber, wherein the speed of flow and the temperature of the glass can be made uniform throughout the entire width of the flow by creating a relatively short column of heat above the central flow of the stream, and a relatively high column along both edge portions thereof.

13. The process of producing sheet glass, consisting in flowing a stream of molten glass from which a sheet of glass is to be drawn through a cooling chamber, wherein the speed of flow and the temperature of the glass can be made uniform throughout the entire width of the flow by retarding the central flow of the stream, and creating a relatively shorter heat column over the center flow than over the edge portions.

14. The process of conditioning a stream of molten glass for use in sheet glass manufacture, consisting in flowing the stream through a cooling chamber, wherein the depth of the central flow of the stream is reduced, and then absorbing heat therefrom.

15. The process of conditioning a stream of molten glass for use in sheet glass manufacture, consisting in flowing the stream through a cooling chamber, wherein the depth of the central flow of the stream is reduced, then absorbing heat from the central flow, and then absorbing heat from the relatively short column of heat above said central flow.

Signed at Toledo, in the county of Lucas and State of Ohio, this 20th day of December, 1924.

ENOCH T. FERNGREN.